United States Patent Office 3,549,360
Patented Dec. 22, 1970

3,549,360
FILM FOR XEROGRAPHIC PRODUCTION OF TRANSPARENCIES AND PROCESS OF MAKING SAME
Arthur J. O'Neill, Middle Haddam, and William P. Rowland, Southington, Conn., assignors to Rowland Products, Incorporated, Kensington, Conn., a corporation of Connecticut
Filed Sept. 29, 1966, Ser. No. 583,024
Int. Cl. G03g *13/14*
U.S. Cl. 96—1.4                                          5 Claims

ABSTRACT OF THE DISCLOSURE

A film for xerographic production of transparencies is provided by a synthetic thermoplastic sheet material having a heat distortion temperature of at least 300° Fahrenheit and at least one surface receptive to adhesion and fusion of xerographic toner. The film has a thin transparent coating of a material providing controlled antistatic properties thereto and is flexible, essentially transparent and unoriented. Both surfaces of the sheet material are mirror-like.

The film may have sheet material adhered along an edge thereof to facilitate feeding in automatic apparatus. Polysulfone is the preferred resin.

---

The present invention relates to xerographic reproduction, and, more particularly, to transparent sheet material for making transparencies by xerographic reproduction and the process of making same.

The science of xerographic reproduction is presently well developed and generally utilizes an electrostatic charge to develop the image being copied upon a substrate. One form of the process employs uncoated substrates and an insulating surface upon which an electrostatic latent image is formed. A developer containing a pigment-resin mixture is then applied to the insulating surface to form an image which is transferred to the substrate passed into contact therewith and fused thereon. Such a process is described in detail in Carlson U.S. Pat. No. 2,297,691 and typical developer formulations are described in detail in Walkup U.S. Pat. No. 2,618,551.

Although transparencies have been made widely by use of a thermographic process promoted widely by Minnesota Mining and Manufacturing Company under the trademark Thermofax, this has not been true for xerographic copying machines. Various substrates have deen developed for use in xerographic equipment but these have generally been opaque and none has been commercially available for widespread use on the commercially available equipment.

It is an object of the present invention to provide a film for xerographic production of transparencies which is relatively economical and adapted to convenient use in commercially available equipment without modification and by untrained operators.

It is also an object to provide such a film which is adapted to automatic feeding in commercially available equipment and which provides highly desirable optical properties.

Another object is to provide a method for making such film which is relatively simple and economical and which will ensure optically desirable properties and pleasant feel and appearance.

Figure 1:
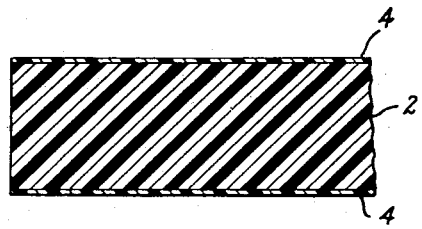
Figure 2:
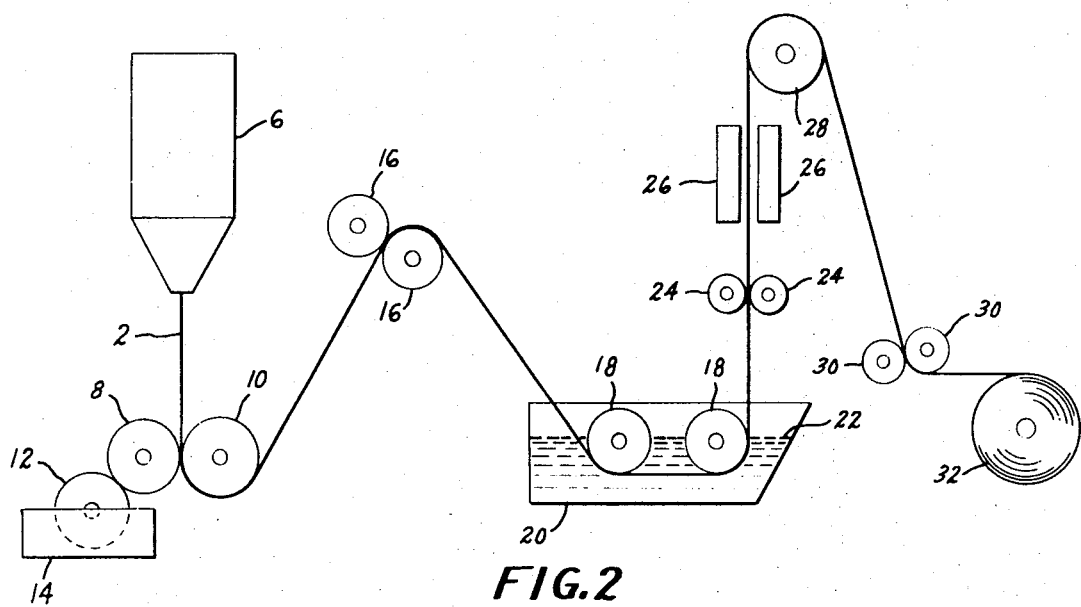

Other objects and advantages will be readily apparent from the following detailed specification and the attached drawing wherein:

FIG. 1 is a fragmentary sectional view to an enlarged scale of a film embodying the present invention; and FIG. 2 is a diagrammatical representation of apparatus for making the film of FIG. 1.

It has now been found that the foregoing and related objects can be readily attained by a film for xerographically producing transparencies comprising a synthetic thermoplastic sheet material having a thickness of about 0.0025 to 0.010 inch and essentially transparent and unoriented. Both surfaces of the sheet material are mirror-like and the synthetic thermoplastic has a heat distortion temperature of at least 300° Fahrenheit.

To facilitate feeding and handling of the film in the apparatus and to aid in dissipation of electrostatic charges, the film desirably has applied to the surface thereof a coating of an ionic material which provides anti-static properties and lubricity. The coating should be thin and transparent so as not to interfere with the optical properties of the sheet material.

Since it is highly desirable that a multiplicity of sheets of the film be stacked for packing, storage and shipment and since it is desirable to be able to employ the automatic feeding equipment in xerographic equipment, the film is desirably treated or provided with means to facilitate slippage between adjacent sheets. Such is desirably provided by an ionic material used for coating the film as hereinbefore described. Other means for facilitating feeding and handling of the several sheets in a stack, however, may be employed such as a separate piece of sheet material such as tissue paper, tape or a plastic adhered along one or more edges of the film, a finely divided material interposed between adjacent sheets such as talc, embossments in the peripheral area of the film outwardly from the projection area, etc. In some instances, it may be possible to have one or more pieces of sheet material adhered to and covering substantially all of the surface opposite that to which the toner or developer composition is to be applied.

The synthetic thermoplastic used for the film must have a heat distortion temperature above 300° Fahrenheit and preferably above 320° Fahrenheit. It must also exhibit receptivity or adhesion for the resin in the toner or developer composition which is to be fused thereonto. In addition, it must be essentially transparent although some coloration is tolerable and it must have good optical transmission. Although it should be flexible to permit its passage through the xerographic apparatus and to withstand normal conditions of use, it should also be form sustaining so as to avoid undesired distortion, problems in handling etc. Although a number of resins such as polyphenylene oxide and modified polycarbonates (such as that sold by Eastman Kodak under the designation "K–1") possess the desired properties to varying degrees, polysulfones have been found particularly advantageous because of their good all around balance of properties.

As previously indicated, the thickness of the sheet material may vary from 0.0025 to 0.010 inch but is preferably about 0.004 to 0.007 inch to provide adequate thickness for normal wear and tear and to resist any tendency toward distortion during heating in the fusion cycle of the xerographic apparatus. However, the optimum thickness tends to vary with the particular model of xerographic apparatus employed.

As previously indicated, the film must have a mirror-like surface on both sides for optimum properties. Aberrations in thickness or uniformity of glossy surface tend to evidence themselves in the quality of the transparency and, in turn, the quality of the projected image. Similarly, the film should be substantially free from gels and other light-interfering particles such as dust to avoid undesirable effects upon the transparency; accordingly, only high quality resins should be employed and precautions should be taken to avoid contamination and to eliminate any gels or foreign matter by screen packs in the extruder or other means.

To achieve the desired mirror-like surface and substantially uniform surface, the extruded resin is passed into the nip between a pair of mirror-polished rolls, at least one of which has a relatively resilient peripheral surface. Preferably both of the rolls have relatively resilient peripheral surfaces so that a desirable ironing action takes place accommodating pulses in the thickness of the resin with the resilient surface permitting closer control over thickness than statically located opposing surfaces since the resilient surface allows positive pressure to be applied. One of the rolls may be a roll having a metallic peripheral surface such as steel if so desired. Various materials may be used for the mirror-like peripheral surface of the resilient roll including polytetrafluroethylene, silicones, neoprene, and other resins having high temperature properties. It is not desirable that the resin be highly resilient and a durometer of about sixty to one hundred and ten and preferably seventy to ninety is generally satisfactory.

After formation of the resin about a metal core, the surface is polished to the desired mirror-finish. A highly resirable procedure has been to extrude the resin into a tube about the metal core and first to lap with an abrasive of about 500–600 grit to obtain a smooth polish eliminating the die lines. This surface is then rubbed with a fine grit rubbing compound such as white automobile rubbing compound and lastly with a glazing polish such as that used for aircraft glazing which is generally kieselguhr in water. Finally, the surface is rinsed completely and dried.

To minimize the deleterious effect of heat upon the resilient surface, the surface thereof is desirably cooled by chilled air or other coolant. One procedure is to employ a roll rotating in a cold water bath which tangentially contacts the resilient surface of the roll so as to extract heat therefrom.

Although various antistatic compounds have been used for other applications, those used in the instant invention must be non-oily and essentially transparent while providing some slip properties and control, but not total elimination, of electrostatic charge since this would interfere with the xerographic process. In some instances, the coating should be applied to only one surface so as not to interfere unduly with the xerographic image. Among the substances which may be employed are waxes such as floor wax, ionic detergents, and inorganic salts of fatty acids. Particularly effective and preferred are monoalkyl quaternary ammonium salts such as the monoalkyl salt of ammonium chloride, and stearic acid, oleic acid, dodecanoic acid, etc. These salts are conveniently used as essentially aqueous solutions although alcohols may be advantageously employed in achieving solution thereof.

The coating may be applied by spraying, roller coating, dipping or any other suitable means, and is preferably limited to a very thin coating to minimize interference with the optical properties. As previously described, one or both sides may be coated depending upon the ionic material employed with the preferred procedure involving coating of both surfaces. The coating should be substantially uniform and dried to a finish which does not detract from the desired mirror-like gloss of the film.

Turning now in detail to the attached drawing, the film of the present invention is shown in the preferred embodiment as transparent synthetic plastic sheet material 2 having coatings 4 on both surfaces of an ionic material. A suitable procedure is shown in FIG. 2 wherein the sheet material 2 issuing from the extruder 6 passes into the nip between a resilient surface roll 8 and a steel roll 10, both of which have highly polished, mirror-like surfaces. The resilient surface roll 8 is cooled by a cooling roll 12 rotating in a tank 14 containing chilled water.

After passage between the mirror rolls 8 and 10, the sheet material 2 passes between a pair of draw rolls 16 and thence below the guide rolls 18 which are disposed within a tank 20 containing a solution 22 of the ionic agent so that its surfaces are coated thereby. The excess solution 22 is removed by the rolls 24, and then the coating is dried by the heaters 26. The sheet material then passes over the roll 28, between the draw rolls 30, and is then coiled on the roll 32.

Illustrative of the efficacy of the present invention is the following specific example:

EXAMPLE

Polysulfone resin was extruded into sheet material 0.005 in thickness and passed into the nip between a mirror-polished steel roll and a second roll having an extruded tube of polytetrafluoroethylene polished to a mirror-like peripheral surface. The polished sheet material was then passed through a bath prepared by dissolving 50 parts of the monoalkyl quaternary ammonium salt of stearic acid and ammonium chloride in 36.5 parts of isopropanol and 13.5 parts of water, and diluting the resultant solution to 0.2 percent by volume with water. The excess solution was removed, the coating dried, and the sheet material subsequently cut into film of about eight and one-half by eleven inches.

The resultant film was assembled into stack without insertion of any intervening material. Packets of the film were inserted into the magazines of xerographic copiers manufactured by Xerox Corporation under the model designations "813" and "914." Various items were reproduced upon the film to form transparencies with the film feeding well in the automatic feeding apparatus of the copiers. The images were clear and well formed with little or no evidence of heat distortion.

Thus, it can be seen that the present invention provides a novel film for xerographic production of transparencies which may be used in existing commercial equipment without modification thereof. The film is relatively economical and has desirable optical properties and, at the same time, enables automatic feeding in its preferred form.

Having thus described the invention, we claim:

1. In the method of making transparencies by a xerographic reproduction process, the steps comprising extruding a synthetic thermoplastic film formed in a resin selected from the group consisting of polysulfones, polyphenylene oxides and polycarbonates and having a heat restoration temperature of at least 300° Fahrenheit; passing said film while softened between a pair of rolls having mirror-polished surfaces to form a film of about 0.0025 to 0.010 inch thickness, at least one of said rolls having a relatively resilient surface, the resultant film being transparent and having mirror-like surfaces; depositing on at least one surface of said film and a thin dry transparent coating providing controlled antistatic properties; and passing said film through a xerographic apparatus to produce on fuse a xerographic image thereon, the resultant image-bearing film being substantially free from distortion.

2. The method of claim 1 wherein said depositing step utilizes a solution of an ionic material to provide said controlled antistatic properties; and wherein said solution-coated film is dried to provide said thin, transparent coating.

3. The method of claim 2 wherein said ionic material is monoalkyl quarternary ammonium salt.

4. The method of claim 1 wherein said thermoplastic is a polysulfone.

5. The method of claim 2 wherein said film is cut into a multiplicity of sheets which are stacked and inserted into the magazine of a xerographic copying apparatus and wherein a plurality of said multiplicity of sheets is individually fed by automatic feed means through said apparatus to produce a xerographic image thereon.

References Cited
UNITED STATES PATENTS

| | | | |
|---|---|---|---|
| 2,723,256 | 11/1955 | Hayek | 260—79.3 |
| 3,438,772 | 4/1969 | Gundlach | 96—1 |
| 3,308,444 | 3/1967 | Chiu Hsian Ting | 96—1.1X |

GEORGE F. LESMES, Primary Examiner

M. B. WITTENBERG, Assistant Examiner

U.S. Cl. X.R.

117—70, 17.5, 138.8; 264—130, 210